US011209933B2

(12) United States Patent
Kim

(10) Patent No.: US 11,209,933 B2
(45) Date of Patent: Dec. 28, 2021

(54) PEN DETECTION UNIT AND DISPLAY DEVICE INCLUDING THE SAME

(71) Applicant: Samsung Display Co., Ltd., Yongin-si (KR)

(72) Inventor: Chul Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/062,623

(22) Filed: Oct. 4, 2020

(65) Prior Publication Data

US 2021/0223934 A1 Jul. 22, 2021

(30) Foreign Application Priority Data

Jan. 17, 2020 (KR) .................. 10-2020-0006812

(51) Int. Cl.
*G06F 3/046* (2006.01)
*G06F 3/041* (2006.01)
*H01Q 1/36* (2006.01)

(52) U.S. Cl.
CPC .......... *G06F 3/04164* (2019.05); *G06F 3/046* (2013.01); *H01Q 1/36* (2013.01); *G06F 2203/04106* (2013.01)

(58) Field of Classification Search
CPC ............... G06F 3/04164; G06F 3/046; G06F 2203/04106; H01Q 1/36
See application file for complete search history.

(56) References Cited

U.S. PATENT DOCUMENTS

| 10,110,046 | B1 | 10/2018 | Esquibel et al. |
| 10,134,349 | B2 | 11/2018 | Zhang et al. |
| 10,275,761 | B2 | 4/2019 | Lee et al. |
| 10,528,176 | B2 | 1/2020 | Liu et al. |
| 2015/0268742 | A1* | 9/2015 | Park ............ G06F 3/04162 345/179 |
| 2018/0328799 | A1 | 11/2018 | Park et al. |
| 2020/0266542 | A1 | 8/2020 | Mu et al. |

FOREIGN PATENT DOCUMENTS

| KR | 10-1548276 | 8/2015 |
| KR | 10-2017-0056450 | 5/2017 |
| KR | 10-2019-0056885 | 5/2019 |
| KR | 10-2082636 | 3/2020 |

* cited by examiner

*Primary Examiner* — Lisa S Landis
(74) *Attorney, Agent, or Firm* — H.C. Park & Associates, PLC

(57) ABSTRACT

A pen detection unit and a display device including a pen detection panel. The pen detection panel includes a plurality of sensor parts, and each of the sensor parts includes a first loop antenna and at least one transistor connected to the first loop antenna. A pen driving circuit detects a position of a pen, based on a sensing signal received through the first loop antenna in a first mode, and transfers the sensing signal to an external electromagnetic induction device in a second mode different from the first mode.

20 Claims, 15 Drawing Sheets

FIG. 2
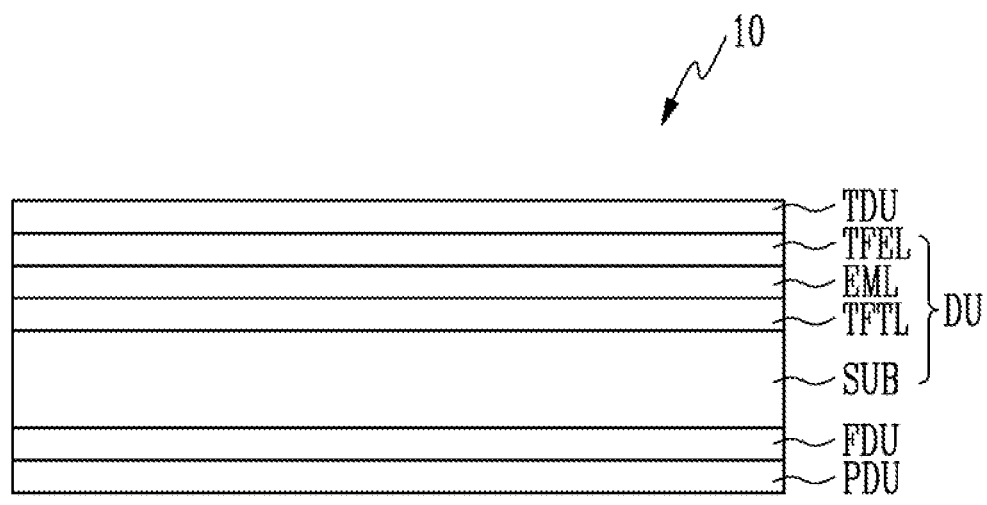
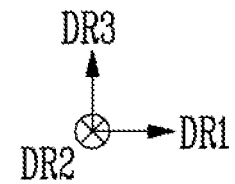

PEN DETECTION UNIT AND DISPLAY DEVICE INCLUDING THE SAME

CROSS-REFERENCE TO RELATED APPLICATION

This application claims priority from and the benefit of Korean Patent Application No. 10-2020-0006812 filed on Jan. 17, 2020, which is hereby incorporated by reference for all purposes as if fully set forth herein.

BACKGROUND

Field

Exemplary embodiments/implementations of the invention relate generally to a pen detection unit and a display device including the same.

Discussion of the Background

Various types of display devices such as a Liquid Crystal Display (LCD) and an Organic Light Emitting Display (OLED) have been used. The OLED displays an image by using an organic light emitting diode in which light is generated by a recombination of electrons and holes.

A display device may include various input modules, and the input modules may include, for example, a touch sensing module for sensing a touch input by a finger of a user, or the like, a fingerprint sensing module for sensing a fingerprint of a user, a pen sensing module for sensing an input by a stylus pen, and the like.

In addition, a recent display device (or electronic device including the display device) may include modules which provide various functions, and the modules may include, for example, a charging module using a wireless charging technology, a communication module using a Near Field Communications (NFC) technology, a payment module using a Magnetic Secure Transmission (MST) technology, and the like.

When antennae for various modules such as a wireless charging module, an NFC module, and an MST module are individually provided in a display device, the thickness of the display device is thickened, and the manufacturing cost of the display device is increased.

The above information disclosed in this Background section is only for understanding of the background of the inventive concepts, and, therefore, it may contain information that does not constitute prior art.

SUMMARY

Exemplary embodiments of the invention provide a display device capable of decreasing the thickness and manufacturing cost thereof.

Additional features of the invention will be set forth in the description which follows, and in part will be apparent from the description, or may be learned by practice of the invention.

An exemplary embodiment of the invention provides a pen detection unit including a pen detection panel including a plurality of pen sensor parts each including a first loop antenna and at least one transistor connected to the first loop antenna; and a pen driving circuit configured to detect a position of a pen, based on a sensing signal received through the first loop antenna in a first mode, and transfer the sensing signal to an external electromagnetic induction device in a second mode different from the first mode.

The pen may include a resonant circuit configured with at least one capacitor and at least one inductor.

The electromagnetic induction device may include at least one among a wireless charging device, a near field communication module, and a magnetic secure transmission module.

The pen detection panel may further include a first scan line connected to a gate electrode of the at least one transistor; and a readout line connected to the first loop antenna. The pen sensor parts may be respectively provided in areas defined by the first scan line and the readout line.

The first loop antenna may have a spiral shape on a plane.

The spiral shape may have a width of 1 mm to 10 mm.

The pen detection panel may further include a second scan line; a driving line; a first transistor including a first electrode connected to the driving line and a gate electrode connected to the first scan line; and a second transistor including a first electrode connected to a first driving voltage line, a second electrode connected to one end of the first loop antenna, and a gate electrode connected to a second electrode of the first transistor.

The pen detection panel may further include a third transistor including a first electrode connected to the one end of the first loop antenna, a second electrode connected to the readout line, and a gate electrode connected to the second scan line.

The pen driving circuit may include: a pen detection block configured to detect the position of the pen, based on the sensing signal; and a switch block configured to connect the readout line to the pen detection block in the first mode, and connect the readout line to the electromagnetic induction device in the second mode.

The pen driving circuit may include a first switch connecting the readout line to the pen detection block, based on a first select signal; and a second switch connecting the readout line to the electromagnetic induction device, based on a second select signal.

In a first period of the first mode, a scan signal having a turn-on voltage level may be provided to the first scan line, and a driving signal having a plurality of pulses may be provided to the driving line.

In a second period of the first mode, a scan signal having a turn-on voltage level may be provided to the second scan line.

In a third period of the second mode, which corresponds to the first period, a scan signal having a turn-off voltage level may be provided to the first scan line.

The pen detection panel may further include a second loop antenna extending along an edge of the pen detection panel.

In the first mode, the second loop antenna may be connected to the electromagnetic induction device. In the second mode, the second loop antenna may be connected to the first loop antenna.

Another exemplary embodiment of the invention provides a display device including a display panel including pixels; a pen detection unit provided on one surface of the display panel; and a power supply unit configured to supply driving power to the display panel, wherein the pen detection unit includes: a pen detection panel including a plurality of pen sensor parts each including a first loop antenna and at least one transistor connected to the first loop antenna; and a pen driving circuit configured to detect a position of a pen, based on a sensing signal received through the first loop antenna in a first mode, and transfer the sensing signal to the power supply unit in a second mode different from the first mode.

The first loop antenna may have a spiral shape on a plane, and the spiral shape may have a width of 1 mm to 10 mm.

The pen detection panel may further include a readout line connected to the first loop antenna. The pen driving circuit may include: a pen detection block configured to detect the position of the pen, based on the sensing signal; and a switch block configured to connect the readout line to the pen detection block in the first mode, and connect the readout line to the power supply unit in the second mode.

The pen detection panel may further include a second loop antenna extending along an edge of the pen detection panel.

The display device may further include a touch detection panel provided on the other surface of the display panel. The touch detection panel may include touch electrodes provided in a touch sensing area and a third loop antenna provided in a non-touch sensing area surrounding the touch sensing area. The third loop antenna may be connected to the power supply unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 2 is a sectional view illustrating an example of the display device illustrated in FIG. 1.

DETAILED DESCRIPTION

Figure 1:
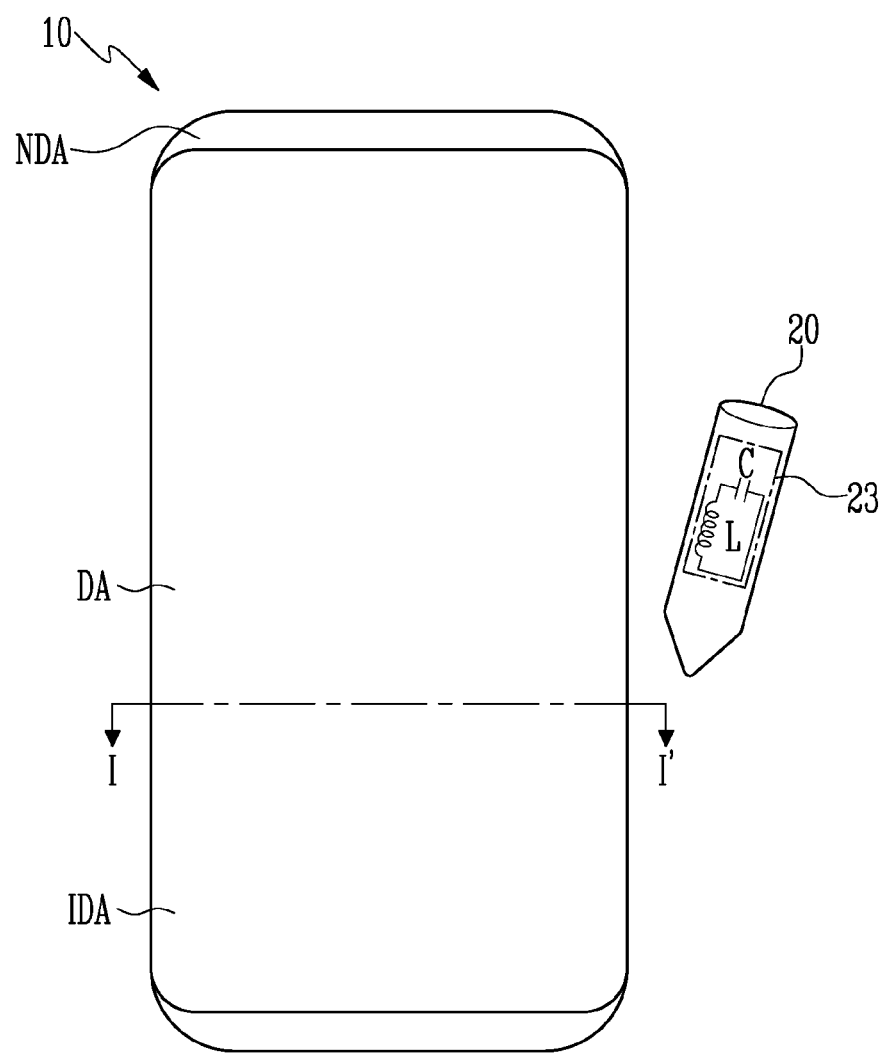
FIG. 1 is a block diagram illustrating a display device in accordance with embodiments of the present disclosure.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are illustrated in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The present disclosure may apply various changes and different shape, therefore only illustrate in details with particular examples. However, the examples do not limit to certain shapes but apply to all the change and equivalent material and replacement.

FIG. 1 is a block diagram illustrating a display device in accordance with embodiments of the present disclosure.

Referring to FIG. 1, the display device 10 may include a display area DA and a non-display area NDA.

The display area DA is defined as an area which displays an image, and a plurality of pixels may be provided in the display area DA.

In an embodiment, the display area DA may be an input sensing area IDA for recognizing a touch input of a user, a fingerprint pattern, a pen input, and the like. For example, the input sensing area IDA may include a plurality of pixels and a plurality of sensors. That is, the input sensing area IDA may display an image, and be used as an area configured to recognize a touch input of a user, a fingerprint pattern, and a pen input.

Although a case where the input sensing area IDA has the same area as the display area DA is illustrated in FIG. 1, the inventive concepts are not limited thereto. For example, the input sensing area IDA may be located in a partial area of the display area DA. In some embodiments, areas configured to recognize a touch input of a user, a fingerprint pattern, a pen input, and the like may be set different from one another.

In an embodiment, the display area DA may have a flat shape. However, the inventive concepts are not limited thereto, and at least a partial area of the display area DA may be bent. Also, the display area DA may be disposed in an edge area of the display device 10.

Although not illustrated in the drawing, the display device 10 may include an accommodating groove capable of accommodating a pen 20. The pen 20 is a component used for a pen input, and may form as a component separate from the display device 10. However, the inventive concepts are not limited thereto, and the pen 20 may be a component included in the display device 10.

In an embodiment, the pen 20 may include a resonant circuit 23. For convenience of description, a case where the resonant circuit 23 includes one capacitor C and one inductor L is illustrated in FIG. 1. However, the inventive concepts are not limited thereto, and the configuration of the resonant circuit 23 provided in the pen 20 may be variously modified. In some cases, the pen 20 may include a plurality of resonant circuits 23.

FIG. 2 is a sectional view taken along line I-I' illustrating an example of the display device 10 illustrated in FIG. 1.

Referring to FIG. 2, the display device 10 may include a display unit DU (or display panel), a touch detection unit TDU (first input detection unit, touch sensing layer, or touch sensing panel) disposed on the top of the display unit DU, a fingerprint detection unit FDU (second input detection unit, fingerprint sensing layer, or fingerprint sensing panel) disposed on the bottom of the display unit DU, and a pen detection unit PDU (third input detection unit, pen sensing layer, or pen detection panel) disposed on the bottom of the fingerprint detection unit FDU.

The display unit DU may include a substrate SUB, a thin film transistor layer TFTL (or pixel circuit layer), a light emitting device layer EML, and a thin film encapsulation layer TFEL, which are all disposed on the substrate SUB.

The substrate SUB may be made of an insulating material such as glass, quartz, or polymer resin. Examples of the polymer material include polyethersulphone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP), and combinations thereof. Alternatively, the substrate SUB may include a metallic material.

The substrate SUB may be a rigid substrate or a flexible substrate which is bendable, foldable, rollable, etc. When the substrate SUB is the flexible substrate, the substrate SUB may be formed of polyimide (PI), but the inventive concepts are not limited thereto.

Figure 3:
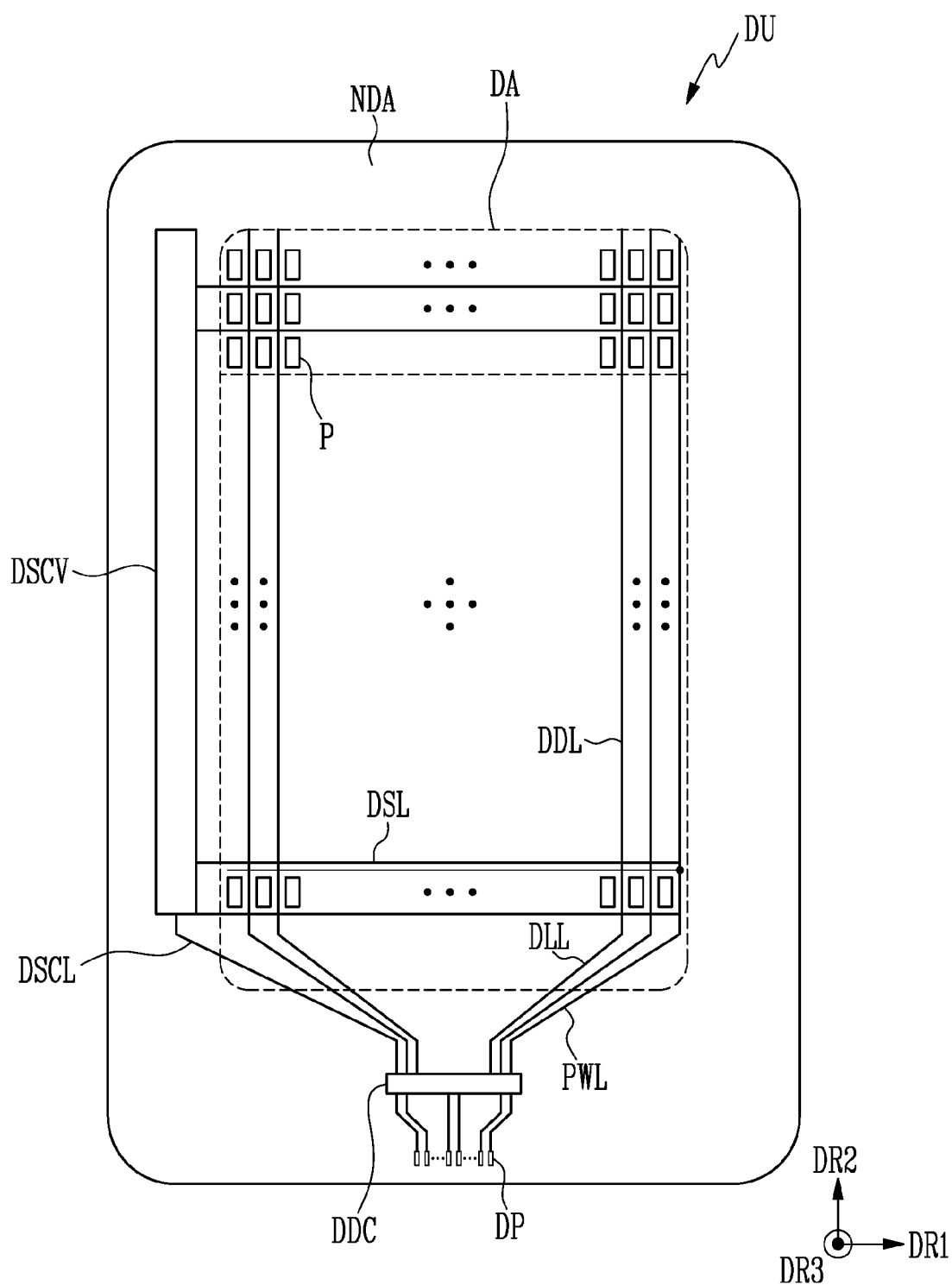
FIG. 3 is a view illustrating an example of a display unit included in the display device illustrated in FIG. 2.

The thin film transistor layer TFTL may be disposed on the substrate SUB. In addition to thin film transistors of each of the pixels, display scan lines, display data lines, power lines, display scan control lines, routing lines connecting display pads and the display data lines, and the like may be formed in the thin film transistor layer TFTL. Each of the thin film transistors may include a gate electrode, a semiconductor layer, a source electrode, and a drain electrode. When a display scan driver DSCV is formed in a non-display area NDA of the display unit DU as illustrated in FIG. 3, the display scan driver DSCV may include thin film transistors (TFTs).

The thin film transistors may be disposed in the display area DA and the non-display area NDA. Specifically, the thin film transistors of each of the pixels, the display scan lines, the display data lines, and the power lines in the thin film transistor layer TFTL may be disposed in the display area DA. The display scan control lines and the routing lines in the thin film transistor layer TFTL may be disposed in the non-display area NDA.

The light emitting device layer EML may be disposed on the thin film transistor layer TFTL. The light emitting device layer EML may include pixels each including a first electrode, a light emitting layer, and a second electrode, and a pixel defining layer defining the pixels. The light emitting device layer EML may be an organic light emitting layer including an organic material. The light emitting device layer EML may include a hole transporting layer, an organic light emitting layer, and an electron transporting layer. When a predetermined voltage is applied to the first electrode and a cathode voltage is applied to the second electrode through the thin film transistor of the thin film transistor layer TFTL, holes and electrons are moved to the organic light emitting layer respectively through the hole transporting layer and the electron transporting layer, and are coupled to each other in the organic light emitting layer, thereby emitting light. The pixels of the light emitting device layer EML may be arranged in the display area DA (see FIG. 1).

The thin film encapsulation layer TFEL may be disposed on the light emitting device layer EML. The thin film encapsulation layer TFEL may prevent oxygen or moisture from penetrating into the light emitting device layer EML. To this end, the thin film encapsulation layer TFEL may include at least one inorganic layer. The inorganic layer may be a silicon nitride layer, a silicon oxynitride layer, a silicon oxide layer, a titanium oxide layer, or an aluminum oxide layer, but the inventive concepts are not limited thereto.

Also, the thin film encapsulation layer TFEL may protect the light emitting device layer EML from a foreign substance such as dust. To this end, the thin film encapsulation layer TFEL may include at least one organic layer. The organic layer may be acrylic resin, epoxy resin, phenolic resin, polyamide resin, or polyimide resin, but the inventive concepts are not limited thereto.

The thin film encapsulation layer TFEL may be disposed in both the display area DA and the non-display area NDA, which are described with reference to FIG. 1. Specifically, the thin film encapsulation layer TFEL may cover the light emitting device layer EML of the display area DA and the non-display area NDA, and cover the thin film transistor layer TFTL of the non-display area NDA.

The touch detection unit TDU may be disposed on the thin film encapsulation layer TFEL of the display unit DU. When the touch detection unit TDU is disposed directly on the thin film encapsulation layer TFEL, the thickness of the display device 10 can be decreased as compared with when a separate touch panel including the touch detection unit TDU is attached onto the thin film encapsulation layer TFEL.

The touch detection unit TDU may include touch electrodes configured to sense a touch of a user by using a capacitance method and touch lines connecting pads and the touch electrodes. For example, the touch detection unit TDU may sense or detect a touch of a user by using a self-capacitance method or a mutual capacitance method.

A detailed configuration of the touch detection unit TDU will be described later with reference to FIG. 4.

A cover window (not illustrated) may be additionally disposed on the touch detection unit TDU. The touch detection unit TDU and the cover window may be attached to each other by a transparent adhesive member such as an optically clear adhesive (OCA).

The fingerprint detection unit FDU may be disposed on the bottom of the substrate SUB of the display unit DU. The fingerprint detection unit FDU may use an organic light emitting device provided in the pixel of the display unit DU as a light source for fingerprint recognition. The fingerprint detection unit FDU may include fingerprint recognition sensors. The fingerprint recognition sensors may be photo sensors. For example, the fingerprint recognition sensors may include a photo diode, a CMOS image sensor, a CCD camera, etc., but the inventive concepts are not limited thereto.

When a finger of a user is in contact with the cover window, lights output from the light emitting device layer EML are reflected by ridges or valleys of the finger of the user, and the reflected lights are received by the fingerprint detection unit FDU, so that the fingerprint detection unit FDU can recognize the pattern of a fingerprint of the user.

The pen detection unit PDU may be disposed on the bottom of the fingerprint detection unit FDU. The pen detection unit PDU may include a pen sensor part PSP (or pen sensor pixel, see FIG. 5). The pen sensor part PSP may be configured with an Electro-Magnetic Resonance (EMR) sensor. When a driving signal is applied to the pen sensor part PSP, an electromagnetic field may be generated in a pen sensor PS of the pen sensor part PSP. The pen 20 (see FIG. 1) having the resonant circuit 23 therein may be resonated by the electromagnetic field to hold a resonant frequency for a certain time and then again output the resonant frequency to the pen sensor part PSP. Accordingly, the pen sensor part PSP (or pen sensing controller) can detect a contact position of the pen 20 by sensing the electromagnetic field output from the pen 20. The resonant circuit 23 is, as an LC combined circuit, a circuit in which a maximum current flows at a specific frequency of applied power, and may extract only an output characteristic in a specific frequency band.

The arrangement order of the display unit DU, the touch detection unit TDU, the fingerprint detection unit FDU, and the pen detection unit PDU, which is illustrated in FIG. 2, is merely illustrative, and the inventive concepts are not limited thereto. In addition, some components among the display unit DU, the touch detection unit TDU, the fingerprint detection unit FDU, and the pen detection unit PDU may be omitted. Although the display unit DU, the touch detection unit TDU, the fingerprint detection unit FDU, and the pen detection unit PDU are illustrated as components separate from one another, this is merely illustrative, and some components among the display unit DU, the touch detection unit TDU, the fingerprint detection unit FDU, and the pen detection unit PDU may be integrally provided.

FIG. 3 is a view illustrating an example of the display unit DU included in the display device 10 illustrated in FIG. 2. For convenience of description, only pixels P, display scan lines DSL, display data lines DDL, data link lines DLL, a power line PWL, display scan control lines DSCL, the display scan driver DSCV, a display driving circuit DDC, and display pads DP in the display unit DU are illustrated in FIG. 3.

Referring to FIG. 3, the display scan lines DSL, the display data lines DDL, the power line PWL, and the pixels P are disposed in a display area DA. The display scan lines DSL may be formed side by side in a first direction DR1, and the display data lines DDL may be formed in parallel in a second direction DR2 intersecting the first direction DR1. The power line PWL may include at least one line formed in parallel to the display data lines DDL in the second direction DR2 and a plurality of lines branching off from the at least one line in the first direction DR1.

Each of the pixels P may be connected to at least one of the display scan lines DSL, at least one of the display data lines DDL, and the power line PWL. The pixel P may include thin film transistors including a driving transistor and at least one switching transistor, an organic light emitting diode, and a capacitor. When a scan signal is applied from the display scan line DSL, a data voltage of the display data line DDL is applied to the pixel P, and the pixel P supplies a driving current to the organic light emitting diode according to the data voltage applied to a gate electrode thereof, thereby emitting light.

The display scan driver DSCV may be connected to the display driving circuit DDC through at least one display scan control line DSCL. The display scan driver DSCV may receive a scan control signal of the display driving circuit DDC. The display scan driver DSCV may generate scan signals according to the display scan control signal and supply the scan signals to the display scan lines DSL.

Although a case where the display scan driver DSCV is formed in the non-display area NDA at a left outside of the display area DA is exemplified in FIG. 3, the inventive concepts are not limited thereto. For example, the display scan driver DSCV may be formed in the non-display area NDA at left and right outsides of the display area DA.

The display driving circuit DDC may be connected to the display pads DP to receive digital video data and timing signals. The display driving circuit DDC may convert digital video data into analog data voltages and supply the analog data voltages to the display data lines DDL through the data link lines DLL. Also, the display driving circuit DDC may generate and supply a scan control signal configured to the display scan driver DSCV through the display scan control lines DSCL. Pixels P to which data voltages are to be supplied may be selected by scan signals of the display scan driver DSCV, and the data voltages may be supplied to the selected pixels P. The display driving circuit DDC may be formed as an integrated circuit (IC) to be attached onto the substrate SUB by using a chip on glass (COG) method, a chip on plastic (COP) method, or an ultrasonic bonding method.

Figure 4:
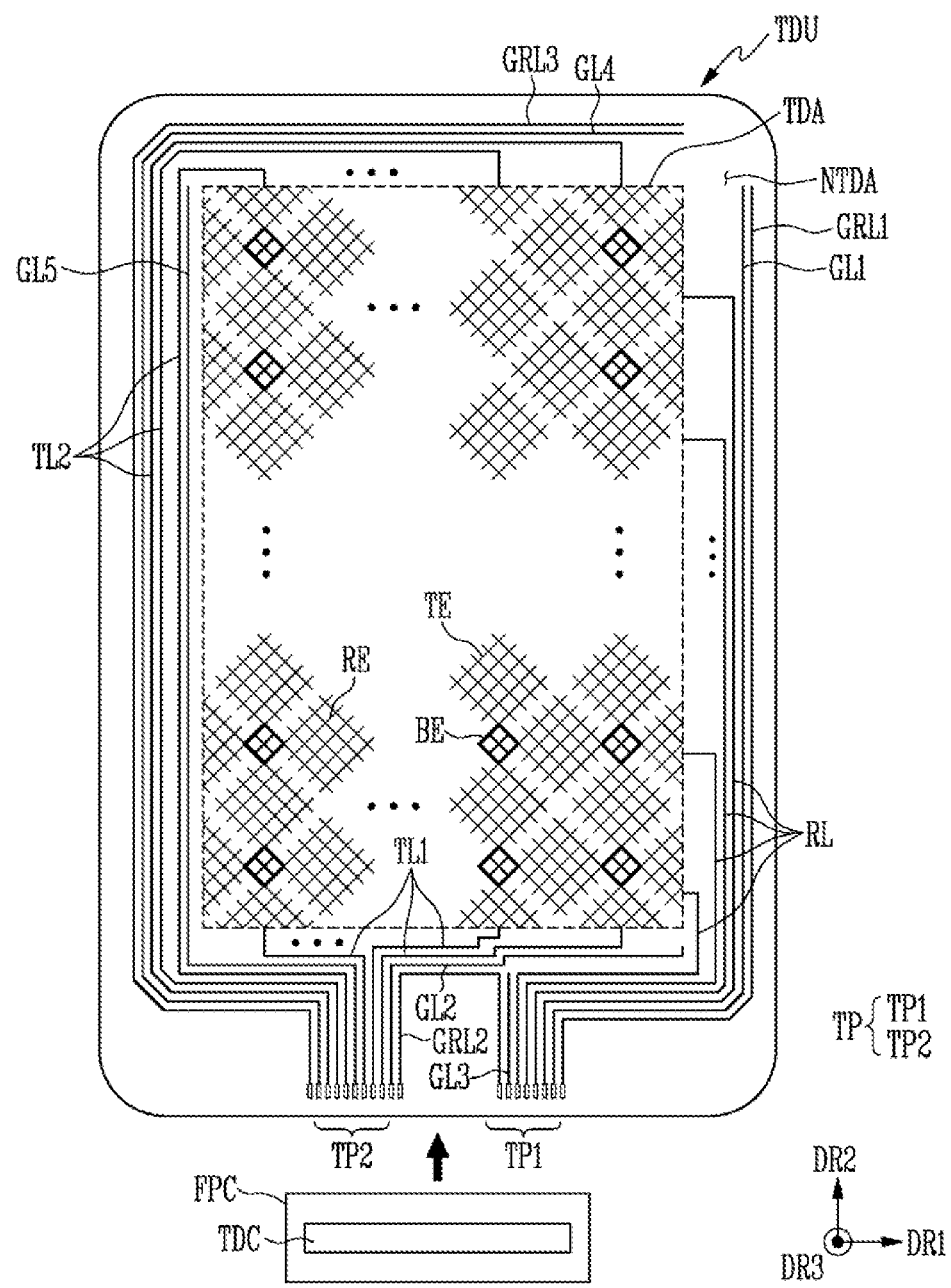
FIG. 4 is a view illustrating an example of a touch detection unit included in the display device illustrated in FIG. 2.

FIG. 4 is a view illustrating an example of the touch detection unit TDU included in the display device illustrated in FIG. 2. For convenience of description, only touch electrodes TE and RE, touch lines TL1, TL2, and RL, and touch pads TP are illustrated in FIG. 4.

Referring to FIG. 4, the touch detection unit TDU may include a touch sensing area TDA configured to sense a touch of a user and a non-touch sensing area NTDA disposed at the periphery of the touch sensing area TDA. The touch sensing area TDA may overlap with the display area DA of the display unit DU, and the non-touch sensing area NTDA may overlap with the non-display area NDA of the display unit DU.

The touch electrodes TE and RE may be arranged in the touch sensing area TDA. The touch electrodes TE and RE may include sensing electrodes RE electrically connected to each other in a first direction DR1 and driving electrodes TE electrically connected to each other in a second direction DR2 intersecting the first direction DR1. Although a case where the sensing electrodes RE and the driving electrodes TE are formed in a diamond planar shape is exemplified in FIG. 4, the inventive concepts are not limited thereto.

Driving electrodes TE adjacent to each other in the second direction DR2 may be electrically connected to each other through a connection electrode BE so as to prevent the sensing electrodes RE and the driving electrodes TE from being short-circuited to each other in intersection areas thereof. The driving electrodes TE and the sensing electrodes RE may be disposed in one layer, and the connection electrode BE may be disposed in a layer different from that of the driving electrodes TE and the sensing electrodes RE. In addition, the sensing electrodes RE electrically connected to each other in the first direction DR1 and the driving electrodes TE electrically connected to each other in the second direction DR2 may be electrically insulated from each other.

The touch lines TL1, TL2, and RL may be arranged in the non-touch sensing area NTDA. The touch lines TL1, TL2, and RL may include sensing lines RL connected to the sensing electrodes RE, first driving lines TL1 and second driving lines TL2, which are connected to the driving electrodes TE.

Sensing electrodes RE disposed at a right side of the touch sensing area TDA may be connected to the sensing lines RL. For example, a sensing electrode RE disposed at a right end among the sensing electrodes RE electrically connected to each other in the first direction DR1 may be connected to a sensing line RL. The sensing lines RL may be connected to first touch pads TP1. A touch driving circuit TDC mounted on a flexible circuit board FPC may be electrically connected to the sensing electrodes RE through the first touch pads TP1.

In an embodiment, driving electrodes TE disposed at a lower side of the touch sensing area TDA may be connected to the first driving lines TL1, and driving electrodes TE disposed at an upper side of the touch sensing area TDA may be connected to the second driving lines TL2. For example, a driving electrode TE disposed at a lower end among the driving electrodes TE electrically connected to each other in the second direction DR2 may be connected to a first driving line TL1, and a driving electrode TE disposed at an upper end among the driving electrodes TE electrically connected to each other in the second direction DR2 may be connected to a second driving line TL2. The second driving lines TL2 may be connected to the driving electrodes TE at an upper side of the touch sensing area TDA via a left outside of the touch sensing area TDA. The first driving lines TL1 and the second driving lines TL2 may be connected to second touch pads TP2. The touch driving circuit TDC may be electrically connected to the driving electrodes TE through the second touch pads TP2.

In an embodiment, the touch electrodes TE and RE may be driven using a mutual capacitance method or a self-capacitance method.

For example, when the touch electrodes TE and RE are driven using the mutual capacitance method, the touch driving circuit TDC may supply driving signals to the driving electrodes TE through the first driving lines TL1 and the second driving lines TL2, and charge mutual capacitances formed in the intersection areas of the sensing electrodes RE and the driving electrodes TE. Subsequently, the touch driving circuit TDC may measure charge variations of the sensing electrodes RE through the sensing lines RL, and determine whether a touch has been input, according to the charge variations of the sensing electrodes RE. The driving signal may be a signal having a plurality of driving pulses.

In another example, when the touch electrodes TE and RE are driven using the self-capacitance method, the touch driving circuit TDC may supply driving signals to both the driving electrodes TE and the sensing electrodes RE through the first driving lines TL1, the second driving lines TL2, and the sensing lines RL, and charge self-capacitances of the driving electrodes TE and the sensing electrodes RE. Subsequently, the touch driving circuit TDC may measure charge variations of the self-capacitances of the driving electrodes TE and the sensing electrodes RE through the first driving lines TL1, the second driving lines TL2, and the sensing lines RL, and determine whether a touch has been input, according to the charge variations of the self-capacitances.

Each of the driving electrodes TE, the sensing electrodes RE, and the connection electrodes BE may be formed as a mesh-shaped electrode. When the touch detection unit TDU including the driving electrodes TE and the sensing electrodes RE is formed directly on the thin film encapsulation layer TFEL described with reference to FIG. 2, a very large parasitic capacitance may be formed between a second electrode of the light emitting device layer EML and a driving electrode TE or sensing electrode RE of the touch sensing layer because the distance between the second electrode of the light emitting device layer EML and the driving electrode TE or sensing electrode RE of the touch sensing layer is short. In order to reduce the parasitic capacitance, each of the driving electrodes TE and the sensing electrodes RE may be formed as a mesh-shaped electrode, instead of a non-pattern electrode of a transparent oxide conductive layer such as ITO or IZO.

A first guard line GL1 may be disposed at the outside of a sensing line RL disposed at the outermost side among the sensing lines RL. In addition, a first ground line GRL1 may be disposed at the outside of the first guard line GL1. That is, the first guard line GL1 may be disposed at a right side of a sensing line RL disposed at the right end among the sensing lines RL, and the first ground line GRL1 may be disposed at a right side of the first guard line GL1.

A second guard line GL2 may be disposed between a sensing line RL disposed at the innermost side among the sensing lines RL and a first driving line TL1 disposed at a right end among the first driving lines TL1. Also, the second guard line GL2 may be disposed between the first driving line TL1 disposed at the right end among the first driving lines TL1 and a second ground line GRL2. Further, a third guard line GL3 may be disposed between the sensing line RL disposed at the innermost side among the sensing lines RL and the second ground line GRL2. The second ground line GRL2 may be connected to a first touch pad disposed at the leftmost side among the first touch pads TP1 and a second touch pad disposed at the rightmost side among the second touch pads TP2.

A fourth guard line GL4 may be disposed at the outside of a second driving line TL2 disposed at the outermost side among the second driving line TL2. In addition, a third ground line GRL3 may be disposed at the outside of the fourth guard line GL4. That is, the fourth guard line GL4 may be disposed at left and upper sides of a second driving line TL2 disposed at left and upper ends among the second driving lines TL2, and the third ground line GRL3 may be disposed at left and upper sides of the fourth guard line GL4.

A fifth guard line GL5 may be disposed at the inside of a second driving line TL2 disposed at the innermost side among the second driving lines TL2. That is, the fifth guard line GL5 may be disposed between the second driving line TL2 disposed at a right end among the second driving lines TL2 and the touch electrodes TE and RE.

In accordance with the embodiment illustrated in FIG. 4, the first ground line GRL1, the second ground line GRL2, and the third ground line GRL3 may be disposed at the outermost side at upper, left, and right sides of the display unit DU. In addition, a ground voltage may be applied to the first ground line GRL1, the second ground line GRL2, and the third ground line GRL3. Thus, when static electricity is applied from the outside, the static electricity can be discharged to the first ground line GRL1, the second ground line GRL2, and the third ground line GRL3.

Also, in accordance with the embodiment illustrated in FIG. 4, because the first guard line GL1 is disposed between the sensing line RL disposed at the outermost side and the first ground line GRL1, the first guard line GL1 can function to minimize that the sensing line RL disposed at the outermost side is influenced by a voltage change of the first ground line GRL1. The second guard line GL2 may be disposed between the sensing line RL disposed at the innermost side and the first driving line TL1 disposed at the outermost side. Thus, the second guard line GL2 can function to minimize that the sensing line RL disposed at the innermost side and the first driving line TL1 disposed at the outermost side are influenced by a voltage change. Because the third guard line GL3 is disposed between the sensing line RL disposed at the innermost side and the second ground line GRL2, the third guard line GL3 can function to minimize that the sensing line RL disposed at the innermost side is influenced by a voltage change of the second ground line GRL2. Because the fourth guard line GL4 is disposed between the second driving line TL2 disposed at the outermost side and the third ground line GRL3, the fourth guard line GL4 can function to minimize that the second driving line TL2 is influenced by a voltage change of the third ground line GRL3. Because the fifth guard line GL5 is disposed between the second driving line TL2 disposed at the innermost side and the touch electrodes TE and RE, the fifth guard line GL5 can function to minimize that the second driving line TL2 disposed at the innermost side and the touch electrodes TE and RE are influenced by each other.

When the touch electrodes TE and RE are driven using the mutual capacitance method, a ground voltage may be applied to the first guard line GL1, the second guard line GL2, the third guard line GL3, the fourth guard line GL4, and the fifth guard line GL5. When the touch electrodes TE and RE are driven using the self-capacitance method, the same driving signals as those applied to the first driving lines TL1, the second driving lines TL2, and the sensing lines RL may be applied to the first guard line GL1, the second guard line GL2, the third guard line GL3, the fourth guard line GL4, and the fifth guard line GL5. However, the configuration and arrangement of the lines TL1, TL2, RL, GL1, GL2, GL3, GL4, GL5, GRL1, GRL2, and GRL3 of the touch detection unit TDU illustrated in FIG. 4 are merely illustrative, and the inventive concepts are not limited thereto.

Figure 5:
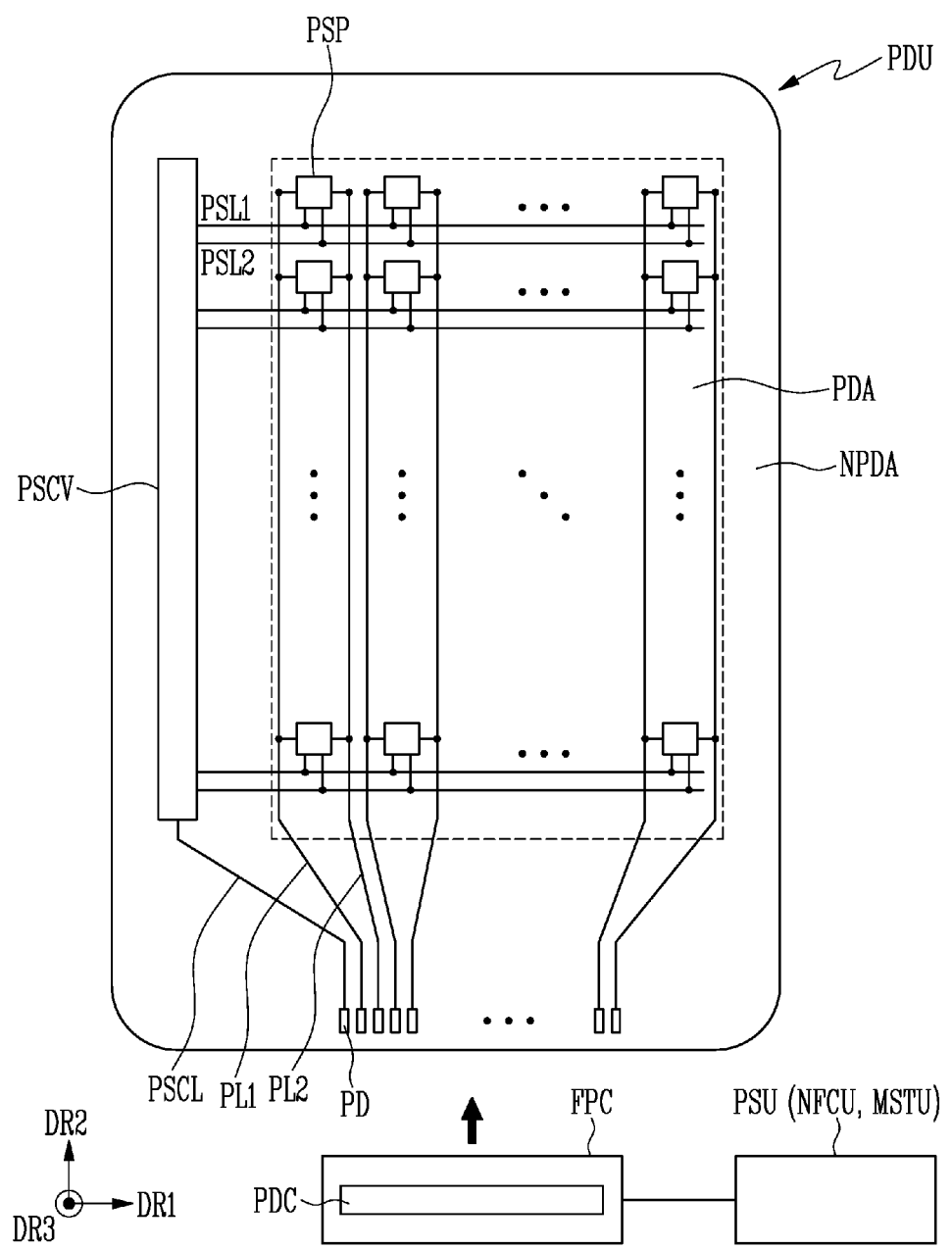
FIG. 5 is a view illustrating an example of a pen detection unit included in the display device illustrated in FIG. 2.
Figure 6:
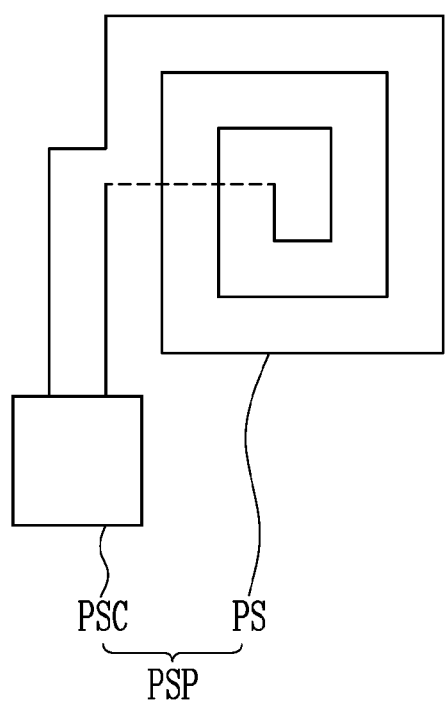
FIG. 6 is a view illustrating a pen sensor part included in the pen detection unit illustrated in FIG. 5.

FIG. 5 is a view illustrating an example of the pen detection unit PDU included in the display device illustrated in FIG. 2. FIG. 6 is a view illustrating the pen sensor part PSP included in the pen detection unit illustrated in FIG. 5.

First, referring to FIG. 5, the pen detection unit PDU (or pen detection panel) may include a pen scan driver PSCV and a pen pad PD, which are located in a non-pen sensing area NPDA, and pen sensor parts PSP located in a pen sensing area PDA. The pen sensing area PDA is an area configured to sense a pen input, and the non-pen sensing area NPDA is defined as an area disposed at the periphery of the pen sensing area PDA.

The pen sensing area PDA may overlap with the display area DA of the display unit DU, and the non-pen sensing area NPDA may overlap with the non-display area NDA of the display unit DU.

The pen sensor parts PSP may be arranged in a matrix form along rows and columns. For example, the pen sensor parts PSP may be provided in a matrix form along rows and columns on a separate substrate. Each of lengths of each of the pen sensor parts PSP in a first direction DR1 and a second direction DR2 may be respectively 1 mm to 10 mm. However, the inventive concepts are not limited thereto, and each of the lengths of the pen sensor part PSP in the first direction DR1 and the second direction DR2 may be variously changed depending on the size of the pen detection unit PDU, the arrangement position of the pen detection unit PDU, and the like.

First pen scan lines PSL1, second pen scan lines PSL2, first pen lines PL1 (or driving lines), and second pen lines PL2 (or readout lines) may be disposed together with the pens sensor parts PSP in the pen sensing area PDA. The first pen scan lines PSL1 and the second pen scan lines PSL2 may be formed in parallel in the first direction DR1, and the first pen lines PL1 and the second pen lines PL2 may be formed in parallel in the second direction DR2. Each of the pen sensor parts PSP may be connected to any one of the first pen scan line PSL1, any one of the second pen scan lines PSL2, any one of the first pen lines PL1, and any one of the second pen line PL2.

Referring to FIG. 6, each of the pen sensor parts PSP may include a pen sensor circuit PSC and a pen sensor PS (or loop antenna, or a coil) connected to the pen sensor circuit PSC. The pen sensor circuit PSC may include at least one thin film transistor. The pen sensor PS may have a spiral shape on a plane. The spiral shape may have a width of 1 mm to 10 mm. For example, the pen sensor PS may have a shape wound at least once from a central portion thereof. Although a case where the pen sensor PS has a square spiral shape is illustrated in FIG. 6, the inventive concepts are not limited thereto. One end of the pen sensor PS may be connected to the pen sensor circuit PSC, and the other end of the pen sensor PS may be connected to a reference power source. The reference power source may be a ground (GND) power source.

The pen sensor PS may be made of a metallic material such as copper (Cu), aluminum (Al), molybdenum (Mo), or silver (Ag). Because the pen sensor PS is located on the bottom of the pixels P, the pen sensor PS is unrelated to transmittance of the display device 10, and thus the line width, thickness, position, and the like of the pen sensor PS are hardly restricted. Because the pen sensor PS is individually disposed for each area, the degree of freedom including a low resistance is provided.

Referring back to FIG. 5, the pen scan driver PSCV may be connected to the pen pad PD through at least one pen scan control line PSCL. The pen detection unit PDU may also include a pen drive circuit PDC in addition to the pen detection panel as described above. The pen driving circuit PDC mounted on a flexible circuit board FPC may be connected to the pen scan driver PSCV through the pen pad PD. The pen scan driver PSCV may receive a pen scan control signal from the pen driving circuit PDC. The pen scan driver PSCV may generate scan signals (or pen scan signals, or first scan signals) according to the pen scan control signal, and supply the scan signals to the first pen scan line PSL1. The first pen scan lines PSL1 may transfer the scan signals to the pen sensor part PSP. Each of the pen sensor parts PSP may be applied with a driving signal of the first pen line PL1.

The pen scan driver PSCV may generate sensing scan signals (or pen sensing scan signals, or second scan signals) according to the pen scan control signal, and supply the sensing scan signals to the second pen scan lines PSL2. The second pen scan lines PSL2 may transfer the sensing scan signals to the pen sensor part PSP. Each of the pen sensor parts PSP may transfer a sensing signal through the second pen line PL2, and the pen driving circuit PDC may detect a pen input and a coordinate of the pen input.

In some embodiments, the pen driving circuit PDC may connect the pen sensor part PSP to a power supply unit PSU. The power supply unit PSU may be included in the display device 10 (see FIG. 1), and store or generate power necessary configured to drive the display device 10. When the power supply unit PSU uses a wireless charging technology (or electromagnetic induction technology), the pen sensor part PSP (or the pen sensor PS) may serve as an antenna of the power supply unit PSU, which receives wireless power.

Meanwhile, although a case where the pen driving circuit PDC connects the pen sensor part PSP to the power supply unit PSU is described in FIG. 5, the pen driving circuit PDC is not limited thereto.

For example, when the display device 10 includes a near field communication module NFCU (i.e., a module using an NFC technology), a magnetic secure transmission module MSTU (i.e., a module using a MST technology), and the like, the pen driving circuit PDC may selectively connect the pen sensor part PSP to at least one of the near field communication module NFCU, the magnetic secure transmission module MSTU, and the like. The pen sensor part PSP (or the pen sensor PS) may serve as an antenna of at least one of the near field communication module NFCU, the magnetic secure transmission module MSTU, and the like.

Figure 7A:
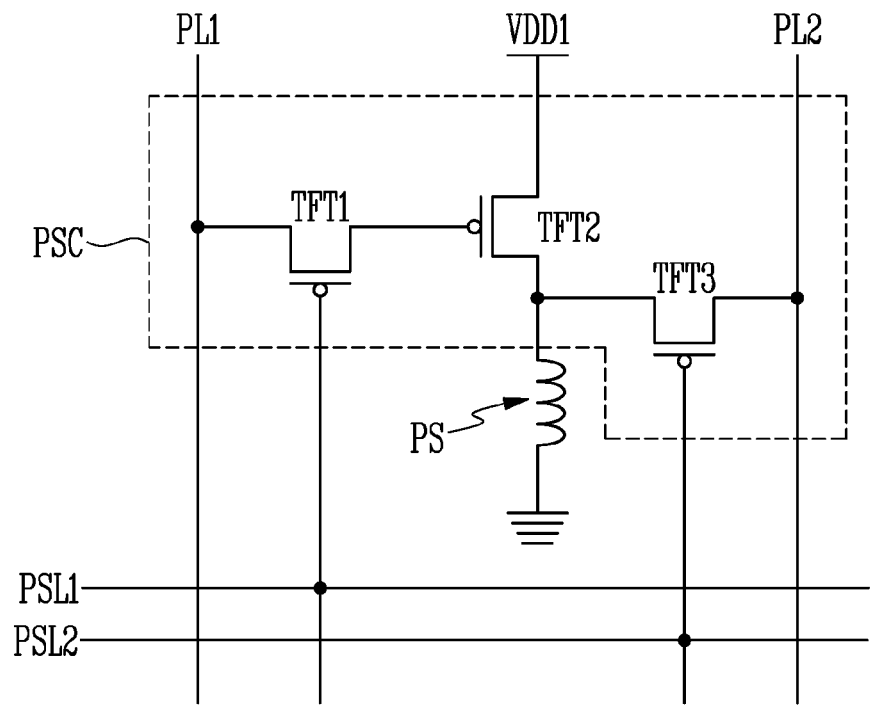
FIG. 7A is a circuit diagram illustrating an example of the pen sensor part illustrated in FIG. 6.

FIG. 7A is a circuit diagram illustrating an example of the pen sensor part illustrated in FIG. 6.

Referring to FIGS. 6 and 7A, the pen sensor part PSP may include a pen sensor circuit PSC and a pen sensor PS, and the pen sensor circuit PSC may include a first transistor TFT1 (or first thin film transistor), a second transistor TFT2, and a third transistor TFT3.

The first transistor TFT1 may include a first electrode connected to a first pen line PL1, a second electrode connected to a gate electrode of the second transistor TFT2, and a gate electrode connected to a first pen scan line PSL1. The first transistor TFT1 may be turned on in response to a scan signal of the first pen scan line PSL1, and connect the first pen line PL1 to the gate electrode of the second transistor TFT2.

The second transistor TFT2 may include a first electrode connected to a first driving voltage line VDD1, a second electrode connected to one end (the PSC end) of the pen sensor PS, and the gate electrode connected to the second electrode of the first transistor TFT1. The second transistor TFT2 may provide a current to the pen sensor PS in response to a driving signal of the first pen line PL1.

The third transistor TFT3 may include a first electrode connected to the second electrode of the second transistor TFT2 (or to the PSC end of the pen sensor PS), a second electrode connected to a second pen line PL2, and a gate electrode connected to a second pen scan line PSL2. The third transistor TFT3 may be turned on in response to a sensing scan signal of the second pen scan line PSL2, and connect the PSC end of the pen sensor PS to the second pen line PL2.

In some embodiments, the pen sensor part PSP may operate in a first mode or a second mode. The first mode is a pen sensing mode. In the first mode, the pen sensor part PSP may generate a first electromagnetic field through the pen sensor PS and detect a second electromagnetic field caused by the pen 20 through the pen sensor PS, and the pen driving circuit PDC (see FIG. 5) may detect a contact of the pen 20 and a coordinate of the contact, based on a current caused by the second electromagnetic field.

The second mode is a charging mode (or reception mode, or information transmission/reception mode). In the second mode, the pen sensor part PSP does not generate the first electromagnetic field, but may detect a third electromagnetic field caused by an external electromagnetic induction device through the pen sensor PS, and provide a current (or information) caused by the third electromagnetic field to the power supply unit PSU (see FIG. 5).

A detailed operation of the pen sensor part PSP will be described later with reference to FIGS. 9 to 12.

Meanwhile, a case where the first to third transistors TFT1, TFT2, and TFT3 are implemented with a P-type Metal Oxide Semiconductor Field Effect Transistor (MOSFET) is illustrated in FIG. 7A, the inventive concepts are not limited thereto. For example, the first to third transistors TFT1, TFT2, and TFT3 may be implemented with an N-type MOSFET.

Also, although a case where the pen sensor circuit PSC (or the pen sensor part PSP) includes three transistors TFT1, TFT2, and TFT3 connected to the first and second pen scan lines PSL1 and PSL2 and the first and second pen lines PL1 and PL2 is illustrated in FIG. 7A, the pen sensor circuit PSC is not limited thereto.

Figure 7B:
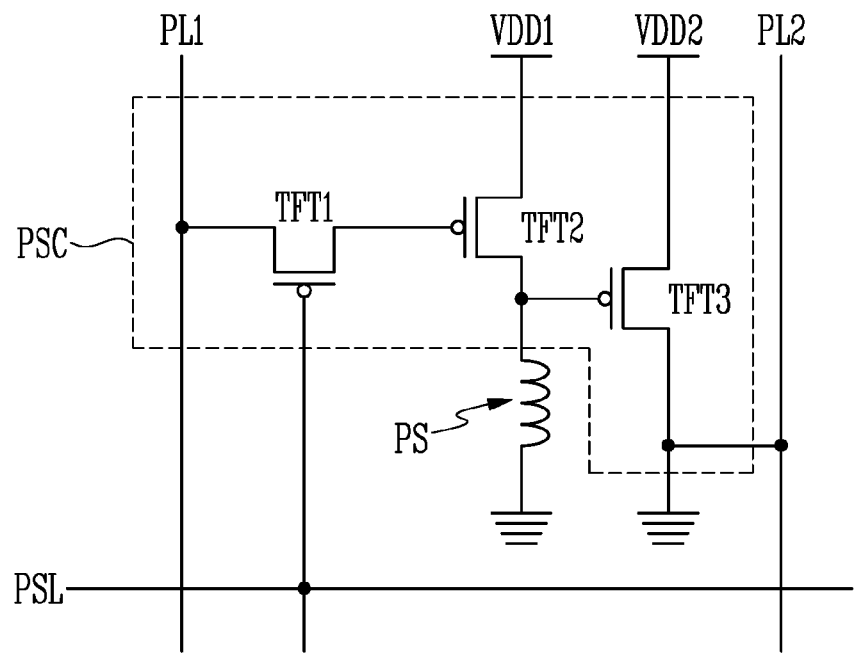
FIGS. 7B, 7C, and 7D are circuit diagrams illustrating other examples of the pen sensor part illustrated in FIG. 6.
Figure 7C:
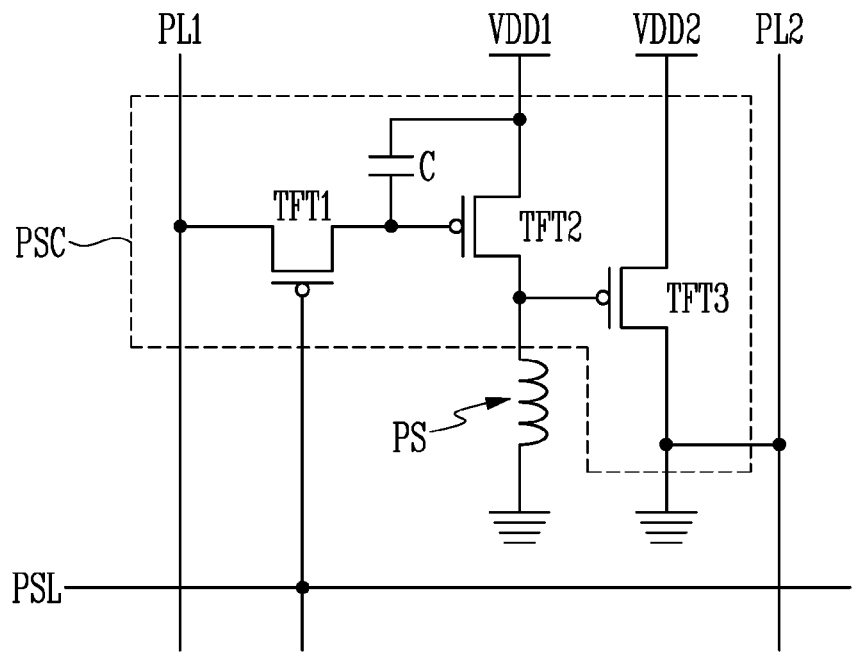
Figure 7D:
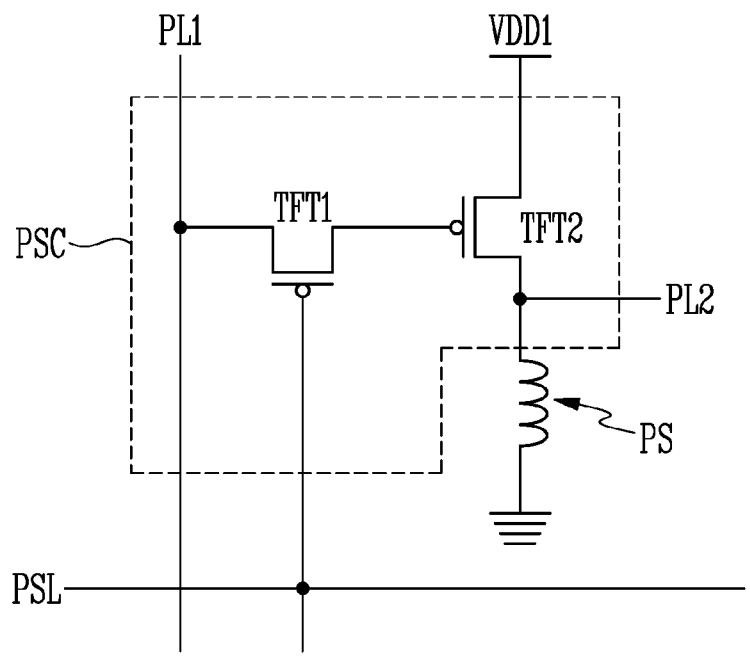

FIGS. 7B to 7D are circuit diagrams illustrating other examples of the pen sensor part illustrated in FIG. 6.

First, referring to FIGS. 7A and 7B, the pen sensor part PSP illustrated in FIG. 7B may be identical or similar to the pen sensor part PSP illustrated in FIG. 7A, except a third transistor TFT3. Therefore, overlapping descriptions will not be repeated.

The first transistor TFT1 may be turned on in response to a scan signal of a pen scan line PSL, and the second transistor TFT2 may supply a current to the pen sensor PS from the first driving voltage line VDD1.

The third transistor TFT3 may include a first electrode connected to a second driving voltage line VDD2, a second electrode connected to a reference power source (and the second pen line PL2), and a gate electrode connected to the one end of the pen sensor PS. The third transistor TFT3 may transfer a current to the second pen line PL2 from the second driving voltage line VDD2 in response to a voltage of the one end of the pen sensor PS. The third transistor TFT3 amplifies a sensing signal detected through the pen sensor PS, so that the sensitivity of the pen detection unit PDU (see FIG. 5) can be improved.

Referring to FIGS. 7B and 7C, the pen sensor part PSP illustrated in FIG. 7C is different from the pen sensor part PSP illustrated in FIG. 7B, in that the pen sensor part PSP illustrated in FIG. 7C further includes a capacitor C.

The capacitor C may be connected or formed between the first driving voltage line VDD1 and the gate electrode of the second transistor TFT2.

Referring to FIGS. 7A and 7D, the pen sensor part PSP illustrated in FIG. 7D is different from the pen sensor part PSP illustrated in FIG. 7A, in that the pen sensor part PSP illustrated in FIG. 7D does not include the third transistor TFT3.

The one end of the pen sensor PS may be directly connected to the second pen line PL2. A current induced in the pen sensor PS may be immediately transferred to the second pen line PL2.

Figure 8:
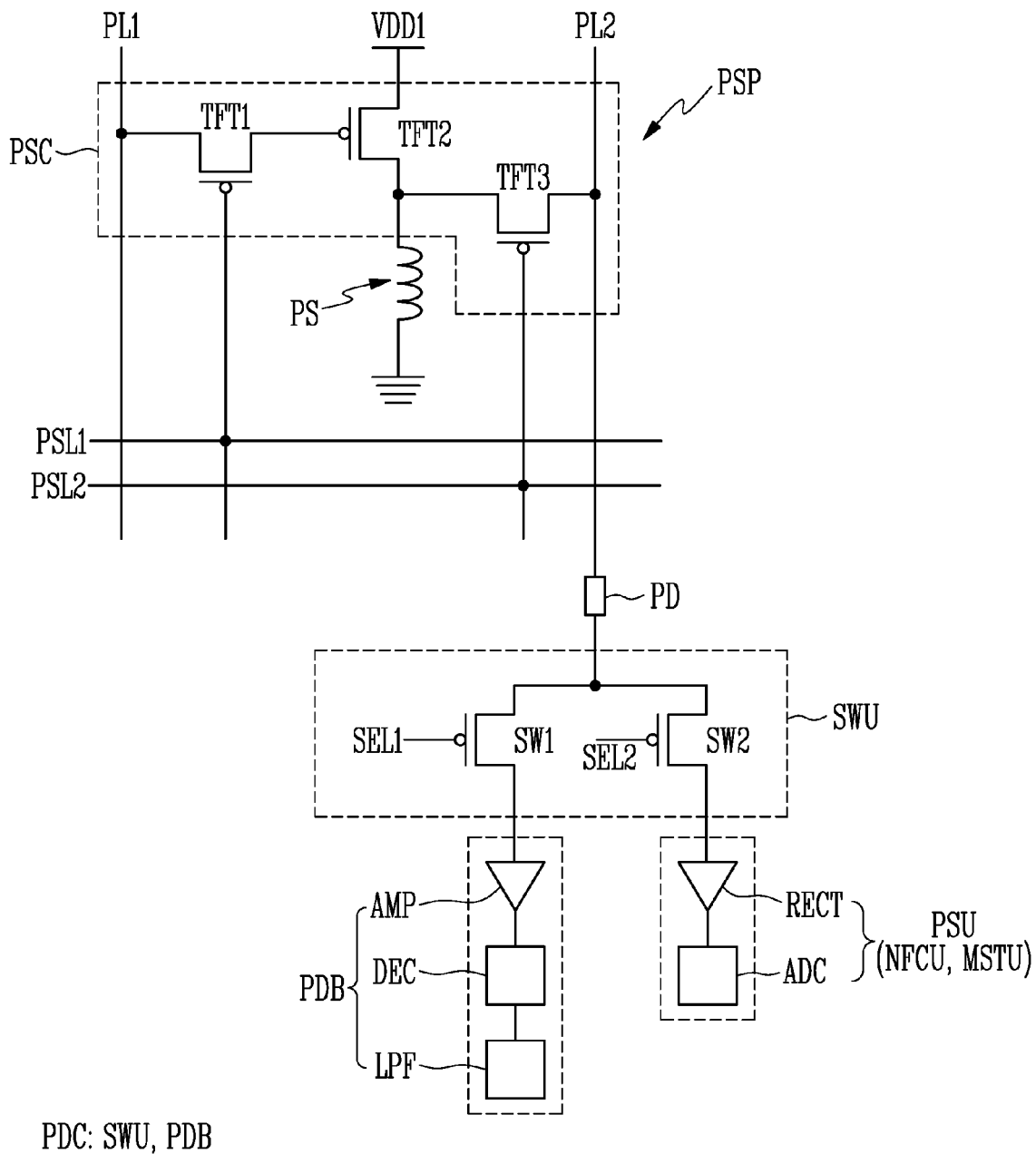
FIG. 8 is a diagram illustrating an example of a pen driving circuit included in the pen detection unit illustrated in FIG. 2.

FIG. 8 is a diagram illustrating an example of the pen driving circuit PDC included in the pen detection unit illustrated in FIG. 2.

Referring to FIGS. 2, 7A and 8, the pen driving circuit PDC may include a switch unit SWU (or switch block) and a pen detection block PDB.

The switch unit SWU may selectively connect the pen detection block PDB or the power supply unit PSU described with reference to FIG. 5 to the pen pad PD, based on select signals SEL1 and SEL2. The select signals SEL1 and SEL2 may be provided from an external device (e.g., application processor). The pen pad PD may be connected to the pen sensor part PSP through the second pen line PL2.

In an embodiment, the switch unit SWU may include a first switch SW1 (or first switching element) and a second switch SW2. The first switch SW1 may be connected between the pen pad PD and the pen detection block PDB, and be turned on in response to a first select signal SEL1, to connect the pen pad PD and the pen detection block PDB. The second switch SW2 may be connected between the pen pad PD and the power supply unit PSU, and be turned on in response to a second select signal SEL2, to connect the pen pad PD and the power supply unit PSU. The first switch SW1 and the second switch SW2 may be implemented with a transistor. However, this is merely illustrative, and the inventive concepts are not limited thereto.

The pen detection block PDB may include an amplifier AMP, a decoder DEC, and a low frequency filter LPF (or low frequency pass filter). The amplifier AMP may amplify a sensing signal provided through the pen pad PD and the switch unit SWU from the pen sensor part PSP, the decoder DEC may output a specific output signal, based on the amplified sensing signal, and the low frequency filter LPF may remove a noise component (e.g., a high frequency component) included in the output signal. That is, the pen detection block PDB may constitute a receiving terminal using an electromagnetic induction technology.

Meanwhile, the power supply unit PSU may include a rectifier RECT and a modulator ADC. The rectifier RECT may allow a sensing signal (or AC current) provided through the pen pad PD and the switch unit SWU from the pen sensor part PSP to pass therethrough in only a specific direction (or allow only a sensing signal having a specific polarity to pass therethrough), and the modulator ADC may modulate an output of the rectifier RECT into a signal available in a battery module (or near field wireless communication module, or the like) provided in the display device 10.

Although a case where the switch unit SWU is included in the pen driving circuit PDC is described in FIG. 8, the inventive concepts are not limited thereto. For example, the switch unit SWU may be formed in the non-pen sensing area NPDA of the pen detection unit PDU through the same process as the pen sensor part PSP.

Figure 9:
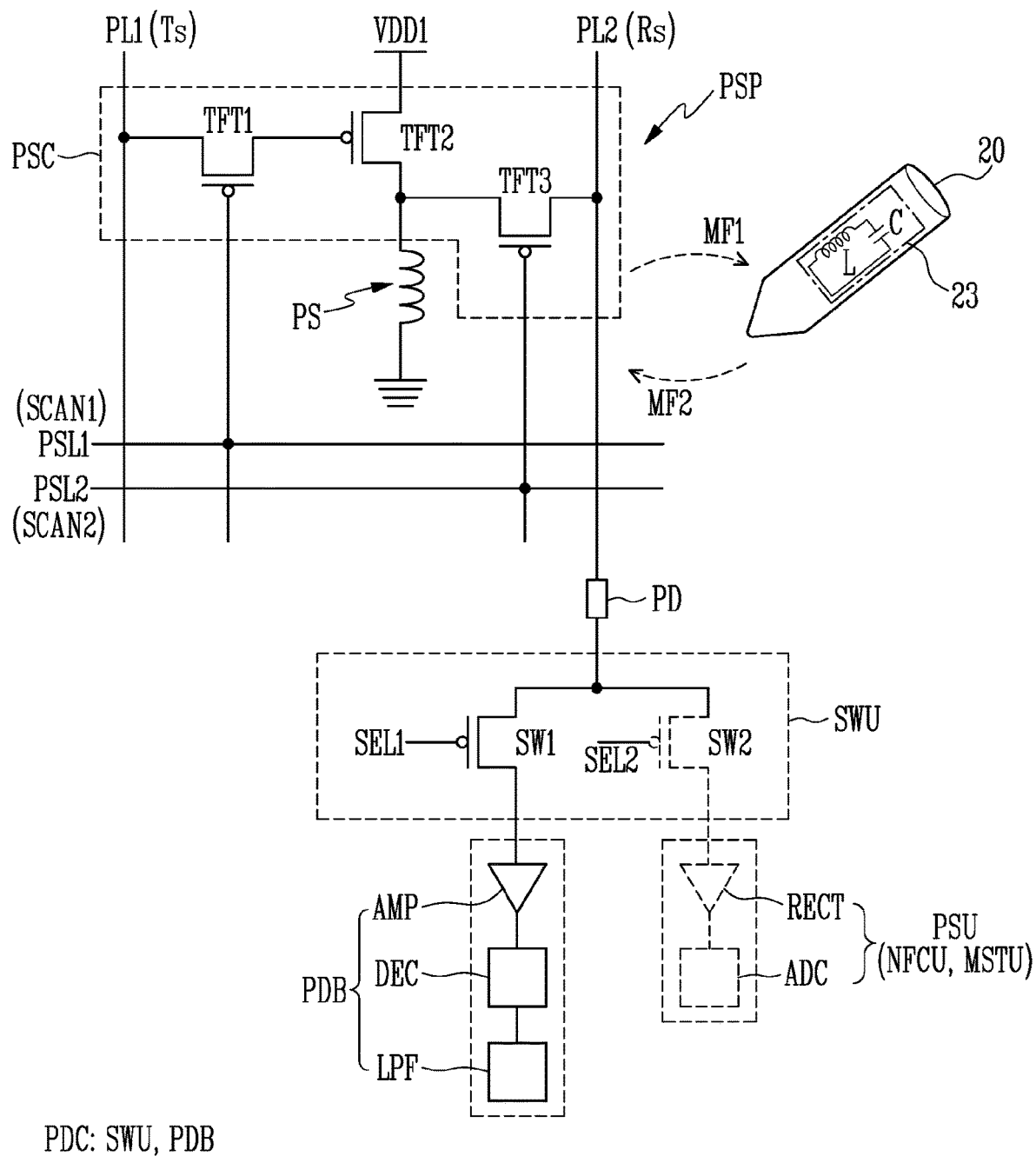
FIGS. 9 and 10 are diagrams illustrating a first operation of the pen driving circuit illustrated in FIG. 8.
Figure 10:
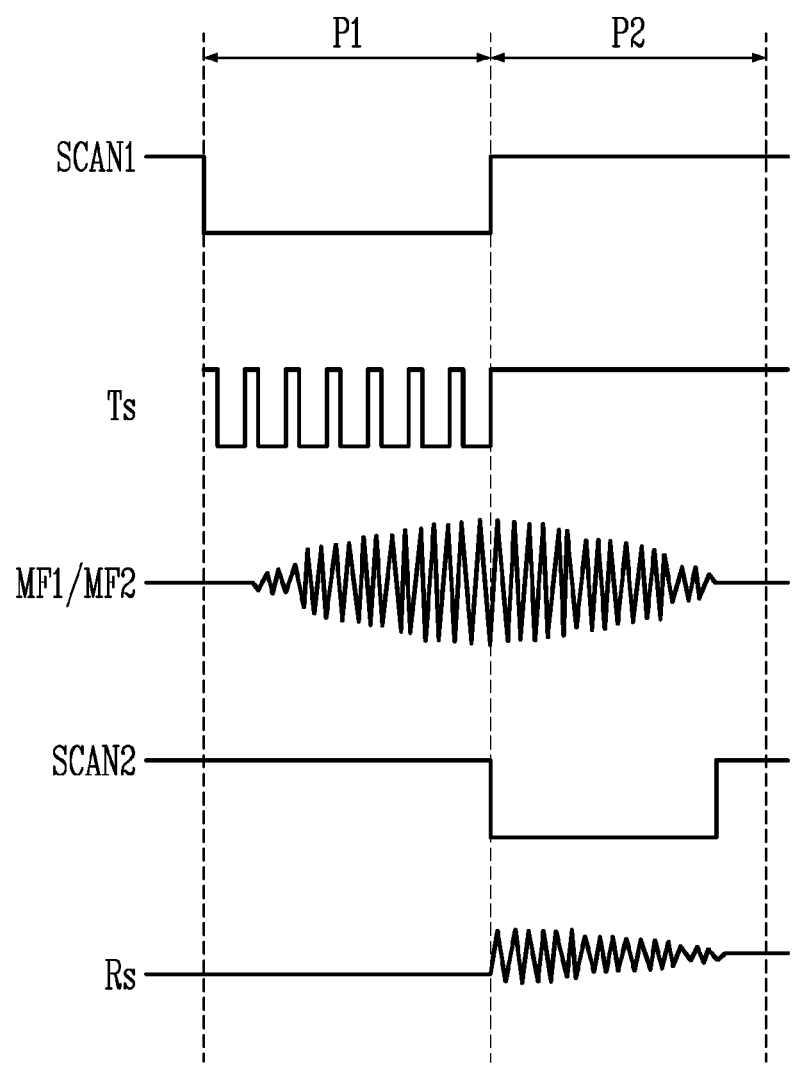

FIGS. 9 and 10 are diagrams illustrating a first operation of the pen driving circuit illustrated in FIG. 8. A connection relationship between the pen driving circuit PDC and the pen sensor part PSP in the first mode is illustrated in FIG. 9, and a waveform diagram of signals measured in the pen driving circuit PDC illustrated in FIG. 9 is illustrated in FIG. 10.

In the first mode (or first operation period), the first select signal SEL1 having a turn-on voltage level may be provided to the first switch SW1, and the first switch SW1 may connect the pen pad PD and the pen detection block PDB. Meanwhile, the second select signal SEL2 may have a turn-off voltage level, and the second switch SW2 may be turned off.

In a first period P1 of the first mode, a scan signal SCAN1 (i.e., a scan signal applied to the first pen scan line PSL1) may have a turn-on voltage level (or logic low level) during the entire first period P1. A driving signal Ts may be provided to the first pen line PL1, and include a plurality of pulses. The frequency of the driving signal Ts may be higher than the frequency of the scan signal SCAN1.

The first transistor TFT1, which is a PMOS transistor in this configuration, may be turned on in response to the scan signal SCAN1 having the turn-on voltage level, and the pulsed driving signal Ts may be provided to the gate electrode of the second transistor TFT2. The second transistor TFT2 may provide an AC current to the pen sensor PS by repeating turn-on and turn-off in response to the pulsed driving signal Ts. A first electromagnetic field MF1 may be generated by the pen sensor part PSP by fluctuation of the current provided to the pen sensor PS through the second transistor TFT2. When the pen 20 is adjacent to the pen sensor PS within a specific distance, the resonant circuit 23 of the pen 20 may be resonated by the first electromagnetic field MF1 generated by the pen sensor part PSP to hold a resonant frequency for a certain time, and the pen 20 may output a second electromagnetic field MF2.

As illustrated in FIG. 10, in a second period P2 of the first mode, the scan signal SCAN1 may be changed to have a turn-off voltage level (or logic high level) for the PMOS transistor, and a sensing scan signal SCAN2 (i.e., a scan signal applied to the second pen scan line PSL2) may have a turn-on voltage level.

The first transistor TFT1 may be turned off in response to the scan signal SCAN1 having the turn-off voltage level, and the second transistor TFT2 may be turned off. The third transistor TFT3 may be turned on in response to the sensing scan signal SCAN2 having the turn-on voltage level (logic low level). Meanwhile, a sensing signal Rs may be generated in the pen sensor PS during the second period P2 by the second electromagnetic field MF2 output by the pen 20. The sensing signal Rs may be provided to the second pen line PL2 through the third transistor TFT3 after the pen 20 engages with the pen sensor PS.

Because the first switch SW1 connects the pen pad PD and the pen detection block PDB, the sensing signal Rs may be provided to the pen detection block PDB. The pen detection block PDB may detect a contact of the pen 20 to the pen sensor PS and a coordinate of the contact.

Figure 11:
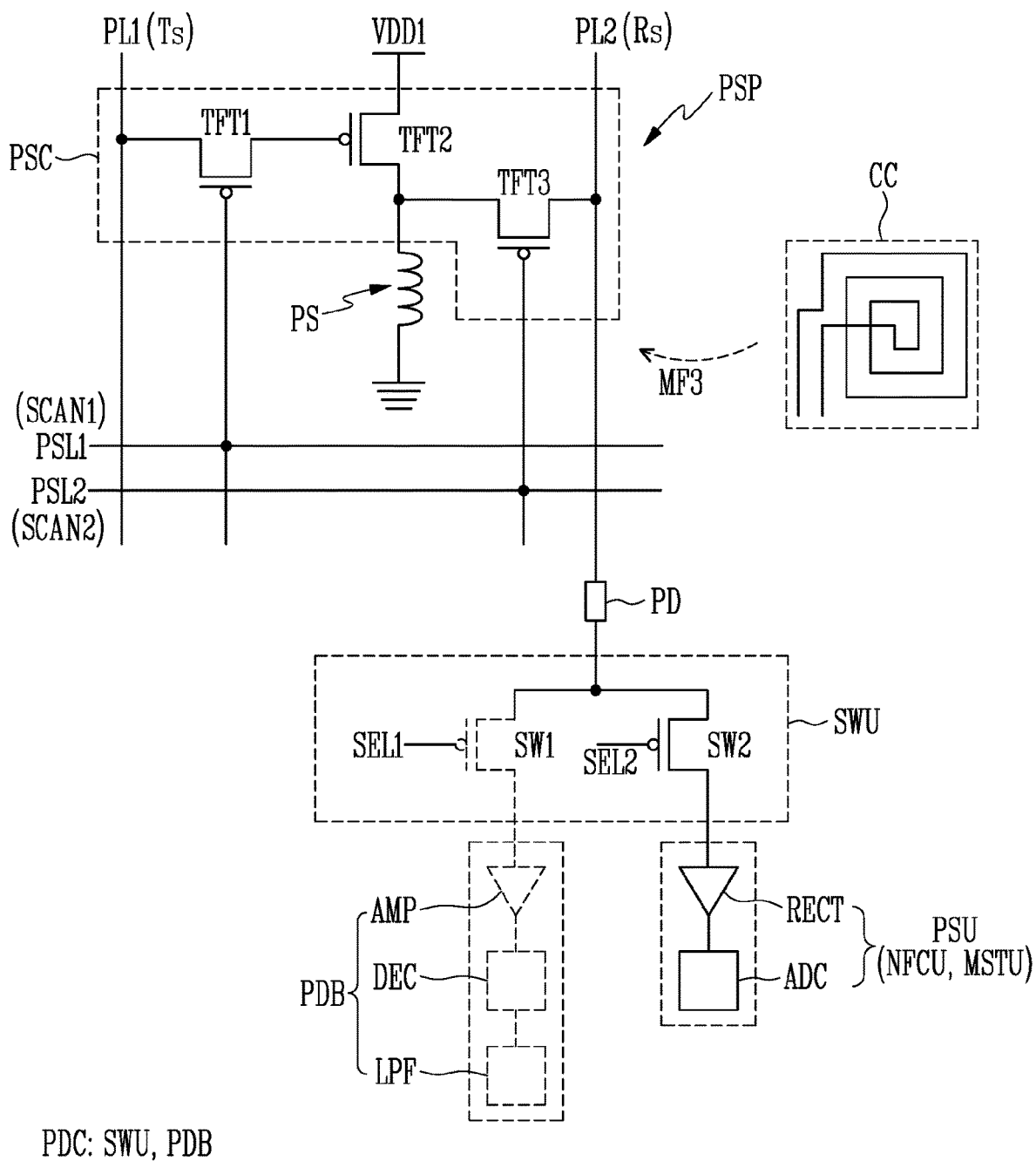
FIGS. 11 and 12 are diagrams illustrating a second operation of the pen driving circuit illustrated in FIG. 8.
Figure 12:
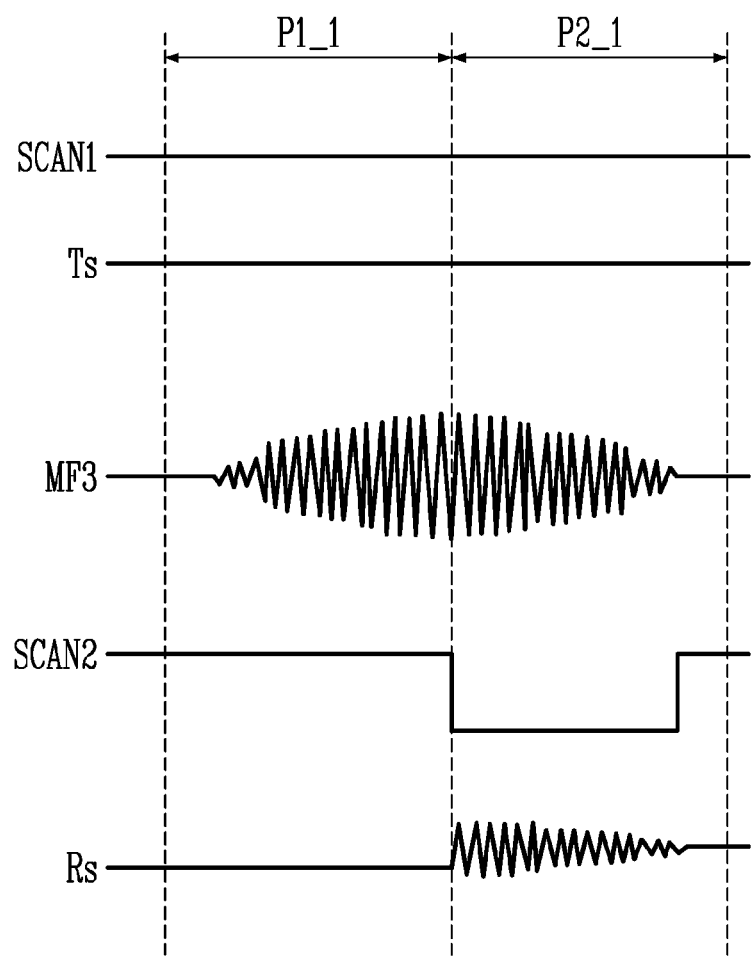

FIGS. 11 and 12 are diagrams illustrating a second operation of the pen driving circuit illustrated in FIG. 8. A connection relationship between the pen driving circuit PDC and the pen sensor part PSP in the second mode is illustrated in FIG. 11, and a waveform diagram of signals measured in the pen driving circuit PDC is illustrated in FIG. 12.

In the second mode (or second operation period), the second select signal SEL2 having a turn-on voltage level may be provided to the second switch SW2, and the second switch SW2 may connect the pen pad PD to the power supply unit PSU. Meanwhile, the first select signal SELL may have a turn-off voltage, and the first switch SW1 may be turned off.

As illustrated in FIG. 12, in a first period P1_1 of the second mode, the scan signal SCAN1 and the driving signal Ts may have a turn-off voltage level. The first period P1_1 may correspond to the first period P1 of the first mode, and the scan signal SCAN1 may be applied to the first pen scan line PSL1, and the driving signal Ts may be applied to the first pen line PL1. Therefore, because the first transistor TFT1 is off and does not trigger the second transistor TFT2 to be on, the pen 20 leaving the pen sensor PS is not registered and any separate first electromagnetic field MF1 may not be generated by the pen sensor part PSP.

Meanwhile, a third electromagnetic field MF3 may be generated by an external electromagnetic induction device CC of the pen 20. When the pen sensor part PSP is adjacent to the electromagnetic induction device CC of the pen 20 within a specific distance, an induced current may be generated in the pen sensor PS. However, because the third transistor TFT3 is in a turn-off state during the first period P1_1 in response to the sensing scan signal SCAN2 having a turn-off voltage level, any separate sensing signal Rs may not be detected in the second pen line PL2.

In a second period P2_1 of the second mode, the sensing scan signal SCAN2 (i.e., a scan signal applied to the second pen scan line PSL2) may have a turn-on voltage level. The second period P2_1 may correspond to the second period P2 of the first mode.

The third transistor TFT3 may be turned on in response to the sensing scan signal SCAN2 having the turn-on voltage level, and a sensing signal Rs generated in the pen sensor PS by the electromagnetic induction device CC may be provided to the second pen line PL2 through the third transistor TFT3. Thus in the first mode and the second mode, the sensing signal Rs may get transferred to the pen pad PD in a second period P2 or P2_1.

Because the second switch SW2 connects the pen pad PD and the power supply unit PSU, the power supply unit PSU may operate based on the sensing signal Rs. Thus, the pen sensor part PSP may transmit the sensing signal Rs resulting from proximity between the pen sensor PS and the pen 20.

As described with reference to FIGS. 9 to 12, the pen sensor PS of the pen sensor part PSP can be used to detect the pen 20 in the first mode, and be used to generate an induced current in the pen sensor PS based on proximity to the external electromagnetic induction device CC in the second mode. That is, various electromagnetic induction modules (i.e., a wireless charging module, a near field wireless communication module, a magnetic secure transmission module, and the like, which use an electromagnetic induction technology) provided in the display device 10 (see FIG. 1) can operate using the pen sensor PS of the pen detection unit PDU. Thus, the space, cost, and the like, which are used to implement antennae of the electromagnetic induction modules in the display device 10, can be reduced.

Figure 13:
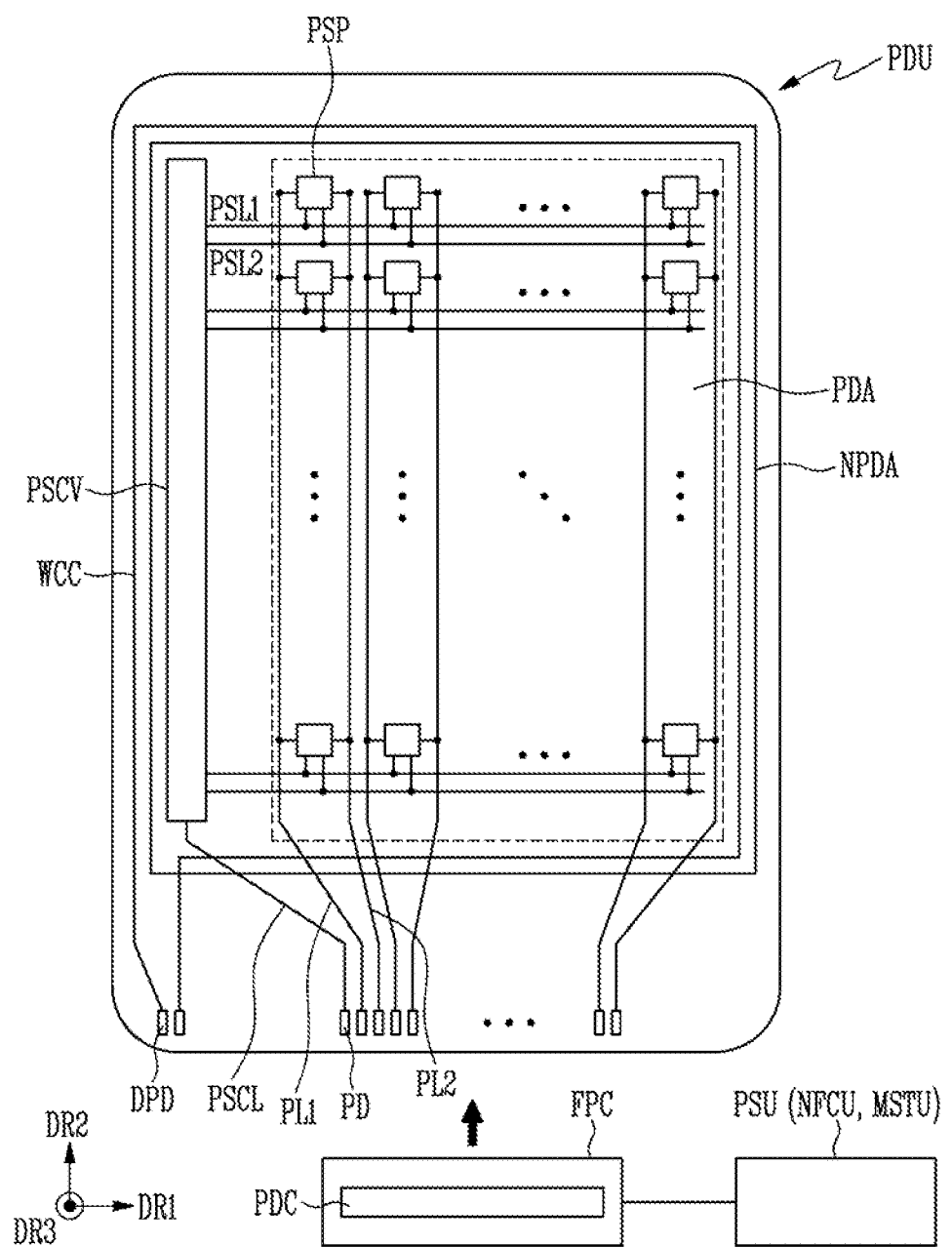
FIG. 13 is a view illustrating another example of the pen detection unit included in the display device illustrated in FIG. 2.

FIG. 13 is a view illustrating another example of the pen detection unit PDU included in the display device illustrated in FIG. 2.

Referring to FIGS. 5 and 13, the pen detection unit PDU illustrated in FIG. 13 is substantially identical or similar to the pen detection unit PDU illustrated in FIG. 5, except that the pen detection unit PDU illustrated in FIG. 13 further includes a loop antenna WCC, and therefore, overlapping descriptions will not be repeated.

The loop antenna WCC may be provided in the non-pen sensing area NPDA of the pen detection unit PDU, extend along an edge of the pen detection unit PDU, and have a shape wound at least once. For example, the loop antenna WCC may be formed through the same process and of the same material as at least one of the gate electrode, the source electrode (or first electrode), and the drain electrode (or second electrode) of the transistor in the pen sensor part PSP.

An auxiliary pad DPD (or second pen pad) may be formed at one side of the pen detection unit PDU in which the pen pad PD (or first pen pad) is disposed, and the pen driving circuit PDC may be connected to the loop antenna WCC through the auxiliary pad DPD. The loop antenna WCC may be a sensing part of the display unit DU in addition to the pen sensor PS.

The pen driving circuit PDC may connect the auxiliary pad DPD to the power supply unit PSU. For example, the pen driving circuit PDC (or the flexible circuit board FPC) may connect the auxiliary pad DPD to the power supply unit PSU through connection lines.

In some embodiments, the pen driving circuit PDC may control the connection structure between the auxiliary pad DPD, the pen pad PD, and the power supply unit PSU.

For example, in the first mode, the pen driving circuit PDC may connect the auxiliary pad DPD to the power supply unit PSU, and interrupt the connection between the auxiliary pad DPD to the power supply unit PSU. In the second mode, the pen driving circuit PDC may connect the auxiliary pad DPD, the pen pad PD, and the power supply unit PSU. For example, the pen driving circuit PDC may connect the loop antenna WCC and the pen sensor PS (see FIG. 6) in series with the power supply unit PSU. The power supply unit PSU may use the loop antenna WCC and the pen sensor PS, so that the operation efficiency of the power supply unit PSU (e.g., the charging efficiency of the power supply unit PSU) can be improved.

Meanwhile, although a case in which the loop antenna WCC is included in the pen detection unit PDU is illustrated in FIG. 13, the loop antenna WCC is not limited thereto.

Figure 14:
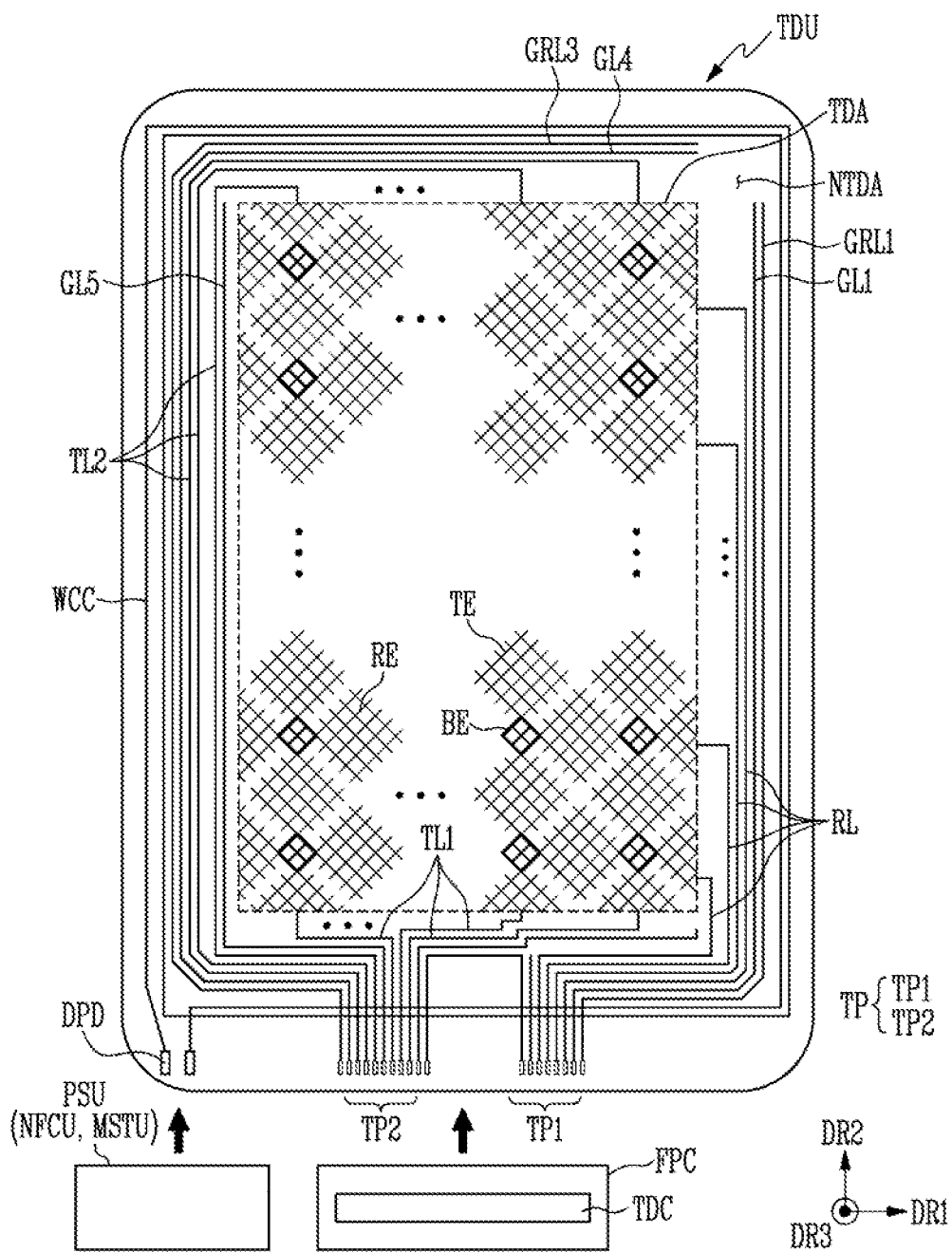
FIG. 14 is a view illustrating an example of the touch detection unit included in the display device illustrated in FIG. 2.

FIG. 14 is a view illustrating an example of the touch detection unit included in the display device illustrated in FIG. 2.

Referring to FIGS. 4 and 14, the touch detection unit TDU illustrated in FIG. 14 may be substantially identical or similar to the touch detection unit TDU described with reference to FIG. 4, except that the touch detection unit TDU illustrated in FIG. 14 further includes the loop antenna WCC (and an auxiliary pad DPD). Therefore, overlapping descriptions will not be repeated.

Referring to FIGS. 13 and 14, the loop antenna WCC and the auxiliary pad DPD, which are illustrated in FIG. 14, may be substantially identical or similar to the loop antenna WCC and the auxiliary pad DPD, which are described with reference to FIG. 13.

The loop antenna WCC may be provided in the non-touch sensing area NTDA of the touch detection unit TDU, extend along an edge of the touch detection unit TDU, and have a shape wound at least once.

The loop antenna WCC may be formed through the same process and of the same material as at least one of the touch electrodes TE and RE and the connection electrode BE.

For example, most of the loop antenna WCC may be formed through the same process as the connection electrode BE (and the first and second driving lines TL1 and TL2), and a portion of the loop antenna WCC, which overlaps with the first and second driving lines TL1 and TL2, may be formed through the same process as the touch electrodes TE and RE.

The power supply unit PSU may be connected to the loop antenna WCC through the auxiliary pad DPD.

In the pen detection unit PDU and the display device 10 including the same in accordance with the present disclosure, a pen sensor PS provided in a pen sensing module is commonly used as an antenna of various modules including a wireless charging module, or an antenna of a specific module is embedded (or integrated) in (or with) another module, so that the thickness and manufacturing cost of the display device 10 can be reduced.

While the present invention has been described in connection with the preferred embodiments, it will be understood by those skilled in the art that various modifications and changes can be made thereto without departing from the spirit and scope of the invention defined by the appended claims.

Thus, the scope of the invention should not be limited by the particular embodiments described herein but should be defined by the appended claims and equivalents thereof

What is claimed is:

1. A pen detection unit comprising:
a pen detection panel including a plurality of pen sensor parts each including a first loop antenna and at least one transistor connected to the first loop antenna; and
a pen driving circuit configured to detect a position of a pen adjacent to a pen sensor part, based on a first electromagnetic field received through the first loop antenna in a first mode, and configured to receive a sensing signal through the first loop antenna based on an external electromagnetic induction device in a second mode different from the first mode.

2. The pen detection unit of claim 1, wherein the pen includes a resonant circuit configured with at least one capacitor and at least one inductor.

3. The pen detection unit of claim 1, wherein the electromagnetic induction device includes at least one among a wireless charging device, a near field communication module, and a magnetic secure transmission module.

4. The pen detection unit of claim 1, wherein the pen detection panel further includes;
a first scan line connected to a gate electrode of the at least one transistor; and
a readout line connected to the first loop antenna; and
wherein the pen sensor parts are respectively provided in areas defined by the first scan line and the readout line.

5. The pen detection unit of claim 4, wherein the first loop antenna has a spiral shape on a plane.

6. The pen detection unit of claim 5, wherein the spiral shape has a width of 1 mm to 10 mm.

7. The pen detection unit of claim 5, wherein the pen detection panel further includes:
a second scan line;
a driving line;
a first transistor including a first electrode connected to the driving line and a gate electrode connected to the first scan line; and
a second transistor including a first electrode connected to a first driving voltage line, a second electrode connected to one end of the first loop antenna, and a gate electrode connected to a second electrode of the first transistor.

8. The pen detection unit of claim 7, wherein the pen detection panel further includes:
a third transistor including a first electrode connected to the one end of the first loop antenna, a second electrode connected to the readout line, and a gate electrode connected to the second scan line.

9. The pen detection unit of claim 8, wherein the pen driving circuit includes:
a pen detection block configured to detect the position of the pen, based on the sensing signal; and a switch block configured to connect the readout line to the pen detection block in the first mode, and connect the readout line to the electromagnetic induction device in the second mode.

10. The pen detection unit of claim 9, wherein the pen driving circuit includes:
a first switch connecting the readout line to the pen detection block, based on a first select signal; and
a second switch connecting the readout line to the electromagnetic induction device, based on a second select signal.

11. The pen detection unit of claim 8, wherein, in a first period of the first mode, a scan signal having a turn-on voltage level is provided to the first scan line, and a driving signal having a plurality of pulses is provided to the driving line.

12. The pen detection unit of claim 11, wherein, in a second period of the first mode, a scan signal having a turn-on voltage level is provided to the second scan line.

13. The pen detection unit of claim 11, wherein, in a third period of the second mode, which corresponds to the first period, a scan signal having a turn-off voltage level is provided to the first scan line.

14. The pen detection unit of claim 7, wherein the pen detection panel further includes a second loop antenna extending along an edge of the pen detection panel.

15. The pen detection unit of claim 14, wherein, in the first mode, the second loop antenna is connected to the electromagnetic induction device, and
wherein, in the second mode, the second loop antenna is connected to the first loop antenna.

16. A display device comprising:
a display panel including pixels;
a pen detection unit provided on one surface of the display panel; and
a power supply unit configured to supply driving power to the display panel,
wherein the pen detection unit includes:
a pen detection panel including a plurality of pen sensor parts each including a first loop antenna and at least one transistor connected to the first loop antenna; and
a pen driving circuit configured to detect a position of a pen adjacent to a pen sensor part, based on a first electromagnetic field received through the first loop antenna in a first mode, and configured to transfer a sensing signal received through the first loop antenna to the power supply unit in a second mode different from the first mode.

17. The display device of claim 16, wherein the first loop antenna has a spiral shape on a plane, and the spiral shape has a width of 1 mm to 10 mm.

18. The display device of claim 16, wherein the pen detection panel includes a readout line connected to the first loop antenna, and
wherein the pen driving circuit includes:
a pen detection block configured to detect the position of the pen, based on the sensing signal; and
a switch block configured to connect the readout line to the pen detection block in the first mode, and connect the readout line to the power supply unit in the second mode.

19. The display device of claim 18, wherein the pen detection panel further includes a second loop antenna extending along an edge of the pen detection panel.

20. The display device of claim 16, further comprising a touch detection panel provided on the other surface of the display panel,
wherein the touch detection panel includes touch electrodes provided in a touch sensing area and a third loop antenna provided in a non-touch sensing area surrounding the touch sensing area, and
wherein the third loop antenna is connected to the power supply unit.

* * * * *